United States Patent
Meinds

(10) Patent No.: US 8,194,071 B2
(45) Date of Patent: Jun. 5, 2012

(54) TILE BASED GRAPHICS RENDERING

(75) Inventor: Kornelis Meinds, Waalre (NL)

(73) Assignee: ST-Ericsson SA, Geneva (CH)

( * ) Notice: Subject to any disclaimer, the term of this patent is extended or adjusted under 35 U.S.C. 154(b) by 888 days.

(21) Appl. No.: 11/597,154

(22) PCT Filed: May 10, 2005

(86) PCT No.: PCT/IB2005/051528
§ 371 (c)(1), (2), (4) Date: Apr. 15, 2008

(87) PCT Pub. No.: WO2005/116930
PCT Pub. Date: Dec. 8, 2005

(65) Prior Publication Data
US 2008/0259076 A1 Oct. 23, 2008

(30) Foreign Application Priority Data
May 24, 2004 (EP) .................................. 04102260

(51) Int. Cl.
*G06T 15/30* (2011.01)
(52) U.S. Cl. ...................... 345/423; 345/581
(58) Field of Classification Search ............ 345/423, 345/581
See application file for complete search history.

(56) References Cited

U.S. PATENT DOCUMENTS

| 6,344,852 B1 | 2/2002 | Zhu et al. |
| 6,697,063 B1 * | 2/2004 | Zhu ............................ 345/421 |
| 2003/0142100 A1 * | 7/2003 | Lavelle et al. ............ 345/537 |

FOREIGN PATENT DOCUMENTS

| EP | 1 127 337 B1 | 8/2001 |
| WO | WO 00/28480 | 5/2000 |

* cited by examiner

*Primary Examiner* — Xiao M. Wu
*Assistant Examiner* — Scott E Sonners

(57) ABSTRACT

A graphics system for tile-by-tile converting of vertex data into output images for displaying on a screen. The vertex data represents objects by a set of polygons and comprises 3D space coordinates for each vertex (q1, q2, ..., q12) in the image. A polygon is constituted of at least three vertices (q1, q2, ..., q12). The system comprises a tile processor, for subdividing the image into a plurality of tiles (t21, 22, t23) and for determining polygon strips (q1-q12), comprising a sequence of polygons. The tile processor is also operative to determine sub-strips (q3-q10) for each polygon strip (q1-q12). Each sub-strip (q3-q10) comprises those polygons of the polygon strip (q1-q12) which at least partly overlap a single one of the tiles (t21, 22, t23). For processing a tile (t21, 22, t23), only the sub-strips (q3-q10), i.e. the polygons covering that tile (t21, 22, t23), have to be processed.

20 Claims, 7 Drawing Sheets

TILE BASED GRAPHICS RENDERING

FIELD OF THE INVENTION

The invention relates to a graphics system for tile-by-tile converting of vertex data into output images for displaying on a screen, the vertex data representing objects by a set of polygons, a polygon being constituted of at least three vertices.

BACKGROUND OF THE INVENTION

European patent EP 1127337 describes an apparatus for shading 3-dimensional computer generated images, representing each object in the image by a set of flat polygons, in particular triangles. A vertex coordinate (x, y, z) is supplied for each vertex of the triangle. A triangle may be sent as part of a triangle strip, if not sent this way than by comparing the vertices against each other, the triangles can be converted to strips. A strip takes up less area of memory, as only n+2 vertices are required to store n triangles instead of 3n. Also only one pointer is then required to point to all the objects in the strip.

According to the method described in EP 1127337, for rendering the graphics data for a tile, all triangles of a strip that overlaps the tile are processed. For example, a triangle that is part of a triangle strip overlapping 50 tiles is processed 50 times, even if that triangle does only overlap a single tile.

SUMMARY OF THE INVENTION

It is an object of the invention to provide a graphics system as set forth in the first paragraph for displaying images on a screen with increased efficiency. The invention is defined by the independent claims. The dependent claims define advantageous embodiments.

This object is realized in that the system comprises an input for receiving the vertex data, the vertex data at least comprising 3D space coordinates for each vertex in the image; a tile processor, being operative to subdivide the image into a plurality of tiles and to determine polygon strips, each polygon strip comprising a sequence of at least one polygon, each succeeding polygon of a polygon strip sharing a side with its preceding polygon and to determine sub-strips, for each polygon strip, each sub-strip comprising those polygons of the polygon strip which at least partly overlap a single one of the tiles, and associate that tile with the overlapping sub-strips; a polygon-tile database comprising a display list for each tile, comprising a respective identification of each one of the sub-strips associated with the tile; and an output for enabling rendering of the images for display on the screen.

The graphics system according to the invention requires only one test per polygon for determining which tiles are covered by the polygon, regardless the number of tiles the polygon strip is affecting. This test is performed by the tile processor after the vertex data is received at the input. Those polygons of a polygon strip, which overlap the same tile, together form a sub-strip associated to the tile. For each tile a list of overlapping sub-strips is administrated in the polygon-tile database. For further processing of each tile, only those polygons, which overlap that tile, are used and no additional tests are required. Whereas if whole polygon strips are processed for each tile instead of sub-strips, a test for determining if a polygon overlaps a tile would be required for every tile and every polygon which is part of a polygon strip that overlaps the particular tile. For example, for a strip of 100 polygons that affects 50 tiles, the known apparatus requires 5000 tests instead of only 100 for the system according to the invention.

The 3D space coordinates may be either, model space, world space, eye space or screen space coordinates or coordinates from another space, such that the coordinates can be mapped to screen space.

In a further aspect of the invention, the identification for each one of the sub-strips associated with the tile comprises a reference to a first vertex of the sub-strip, a last vertex of the sub-strip and/or a number of vertices in the sub-strip.

When using such references to the sub-strips it is not required to store the sub-strips as separate polygon sub-strips. Instead the polygon strips may be stored as a whole. As a consequence memory size requirements and required memory bandwidth are reduced.

These and other aspects of the invention are apparent from and will be elucidated with reference to the embodiments described hereinafter.

DETAILED DESCRIPTION OF A PREFERRED EMBODIMENT

Figure 1:
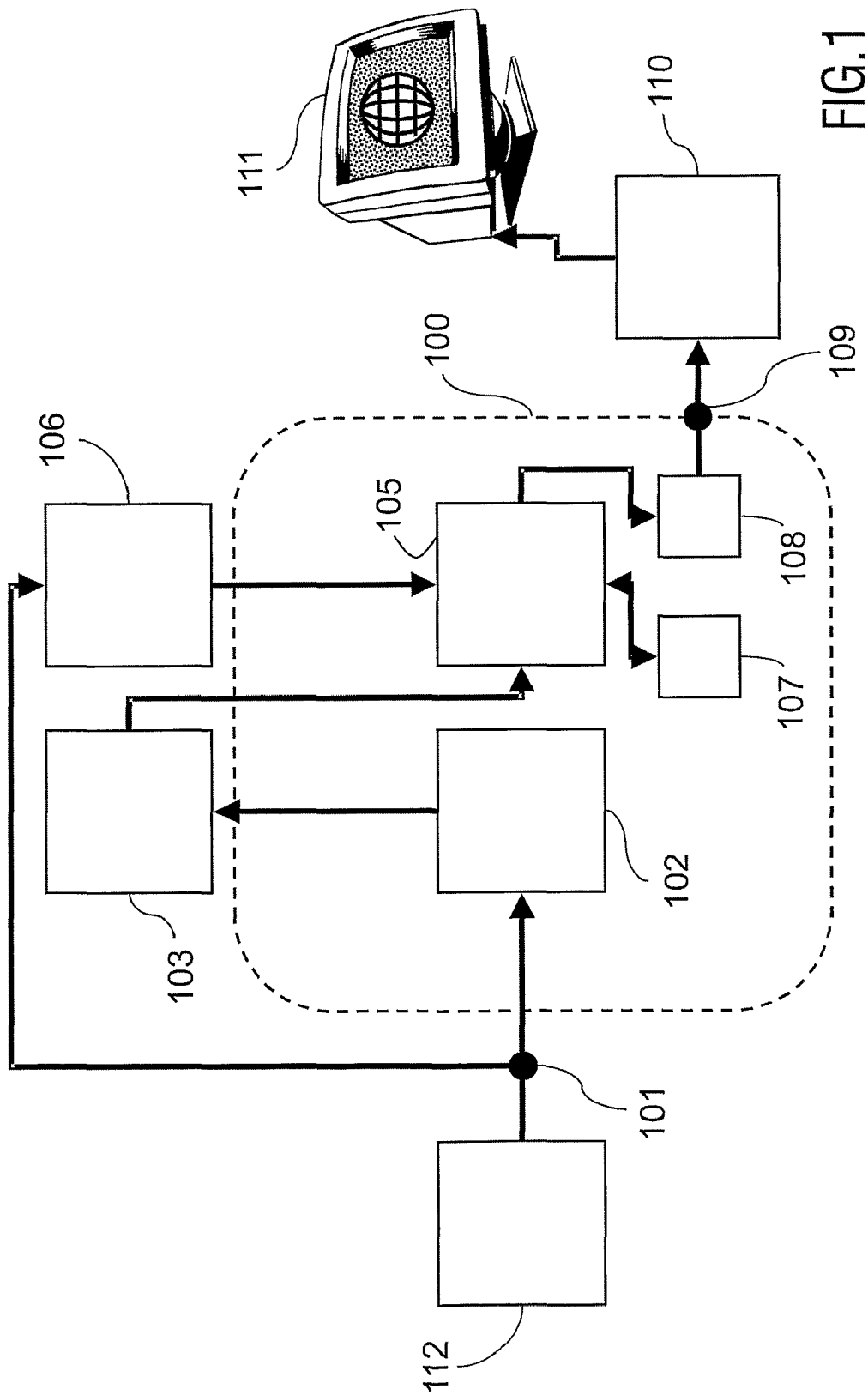
FIG. 1 shows a schematic diagram of an embodiment of a graphics system according to the invention.

FIG. 1 shows a schematic diagram of a graphics system according to the invention. The system comprises an input 101 for receiving graphics data comprising vertex data and texture data. The texture data comprises texture maps and is stored in a texture memory 106. The vertex data comprises information of all vertices in a graphics scene to be displayed and connectivity information for enabling construction of polygons. This information may, for example, comprise (x, y, z) screen space coordinates, defining vertex positions in screen space, (u, v) texture coordinates defining vertex positions in texture space and RGBA values defining vertex colors (R, G and B for red, green and blue) and transparency (A). The graphics data at the input 101 may be provided by a graphics program 112, such as a computer game, or a video clip playback program. The graphics program may provide screen space coordinates, or other 3D space coordinates such as, model space, world space or eye space coordinates. If the graphics program does not provide screen space coordinates, a vertex Transform and Lighting unit (not shown), may be used for mapping the other 3D space coordinates to screen space and for providing the screen space coordinates to the input.

The vertex data is passed on to a Tile Processor 102. The Tile Processor 102 receives the data as polygon strips or it converts the vertex data to polygon strips and stores the pre-processed data in a data structure called polygon-tile database. Usually the polygons are triangles, but other polygon shapes like quadrilaterals and pentagons, may also be used.

When using triangles, the polygon-tile database may be called Triangle Tile DataBase (TTDB) 103. Most embodiments described hereinafter will use triangles. However, it is to be noted that a person skilled in the art could easily use quadrilaterals, pentagons or other polygons instead. The converting of vertices to polygons may be realized by comparing nearby vertices and grouping similar vertices. In the graphics system according to the invention, neighboring and similar polygons are converted to polygon strips. A polygon strip comprises a sequence of at least one polygon, each succeeding polygon sharing one side with its preceding polygon. The use of triangle strips instead of triangles reduces the memory size and bandwidth requirements of the system, as only one vertex is required to define a new triangle and only one pointer is then required to point to all vertices in the strip. When using individual triangles three vertices are required to define a new triangle. For each tile, the Tile Processor 102 determines which parts of the polygon strips overlap that tile. Then sub-strips are defined, comprising those polygons of a polygon strip, which polygons cover a specific one of the tiles. An exemplary algorithm for determining if a polygon overlaps a tile will be elucidated later on, referring to FIG. 5.

The geometry data of the sub-strips and pointers to the first vertex of all sub-strips, overlapping a tile, are stored in the TTDB 103. The TTDB 103 comprises a display list for each tile with a pointer to each one of the sub-strips overlapping that tile. The structure of the TTDB 103 will further be elucidated later on, referring to FIG. 4. A rasterizer 105 converts the data from the TTDB 103 and the texture memory 106 to RGBA pixel values. A detailed description of the processes performed by the rasterizer 105, will be described later on, referring to FIG. 5. The RGBA pixel values for a tile, calculated by the rasterizer 105, are written to a RGBA tile buffer 108. The RGBA pixel values are possibly dependent on a depth test involving reading of the depth (z) value from the Z-tile 107 for that (x, y) pixel coordinate. When all RGBA pixel values for a tile are produced, the RGBA tile is copied to a RGBA frame buffer 110. When the RGBA pixel values for all pixels in all tiles of the graphics scene are in the frame buffer, the graphics scene may be displayed on a display screen 111 or sent to a beamer.

Data processing units, such as the Tile Processor 102 and the rasterizer 105, and small memory buffers, such as the RGBA tile buffer 108, for temporarily storing information used by the processing units are usually part of a graphics processing chip 100. Larger memories, like the TTDB 103, the texture memory 106, and the RGBA frame buffer 109 are usually realized off-chip. 3D graphics requires a lot of data traffic between the off-chip texture memory and the on chip processing units. For efficient graphics processing, this data traffic has to be reduced. Using sub-strips instead of whole polygon strips dramatically reduces the data traffic. When a tile is being processed, the processing only involves the polygons covering that tile. When using whole polygon strips, each polygon of the strip has to be processed, although only part of the strip actually covers the tile that is being processed. Moreover, using the approach according to the invention, required compute resources are drastically reduced.

Figure 2:
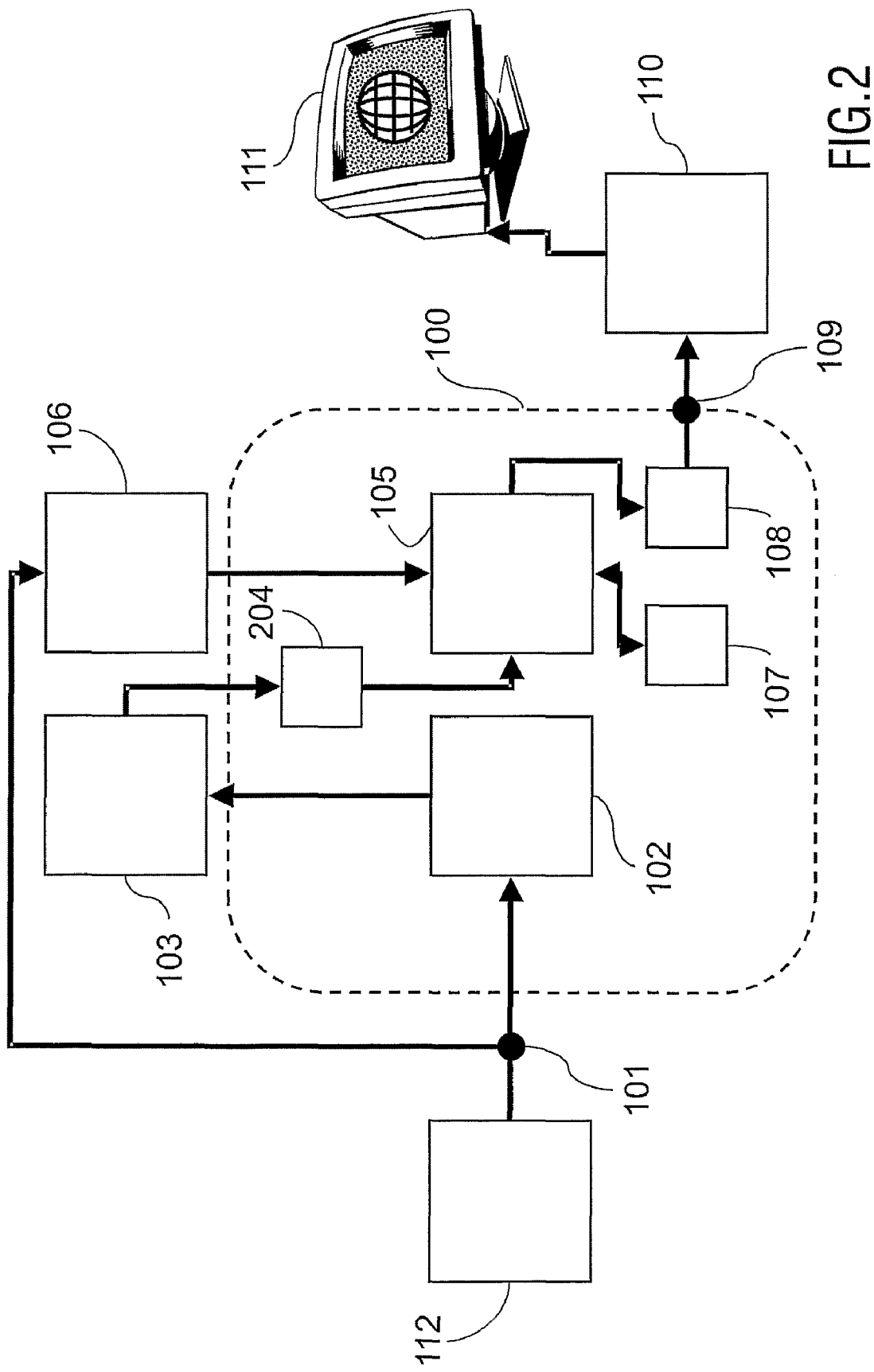
FIG. 2 shows a schematic diagram of a graphics system, comprising a vertex cache.

FIG. 2 shows an embodiment of a graphics system, which is similar to the embodiment shown in FIG. 1, but which additionally comprises a vertex cache 204. Some polygons cover more than one tile. As a consequence these polygons are part of more than one sub-strip. The vertex data of these polygons is to be used during the processing of several tiles. In the graphics system shown in FIG. 2 vertex data is temporarily stored in an on-chip vertex cache 204. By using an on-chip vertex cache 204 the data traffic from off-chip memory is further reduced.

In a preferred embodiment of the graphics system, the vertex cache 204 only maintains carefully selected vertices. For example, vertices of polygons, that overlap only one tile, are to be processed only once and do not have to be maintained in the vertex cache 204. Furthermore, vertices, only overlapping already processed tiles do not have to be maintained in the vertex cache 204. Smart cache management may include comparing a tile-to-tile processing direction with a polygon-to-polygon direction in a polygon strip, for determining if a polygon is to be used again. For example, if a polygon overlaps a first tile and a second tile, the second tile being the upper neighbor of the first tile, and the tile-to-tile traversal direction is from left to right and from top to bottom, this polygon will not be processed again and has not to be maintained in the vertex cache 204. On the contrary, if the tile-to-tile processing direction equals the polygon-to-polygon direction an overlapping polygon will probably be used again and is preferably maintained in the vertex cache 204. Efficient cache management can reduce the required size for the vertex cache 204 and for the graphics processing chip 100. Some examples of efficient cache management will further be elucidated later on, referring to FIG. 7A-7C.

Figure 3:
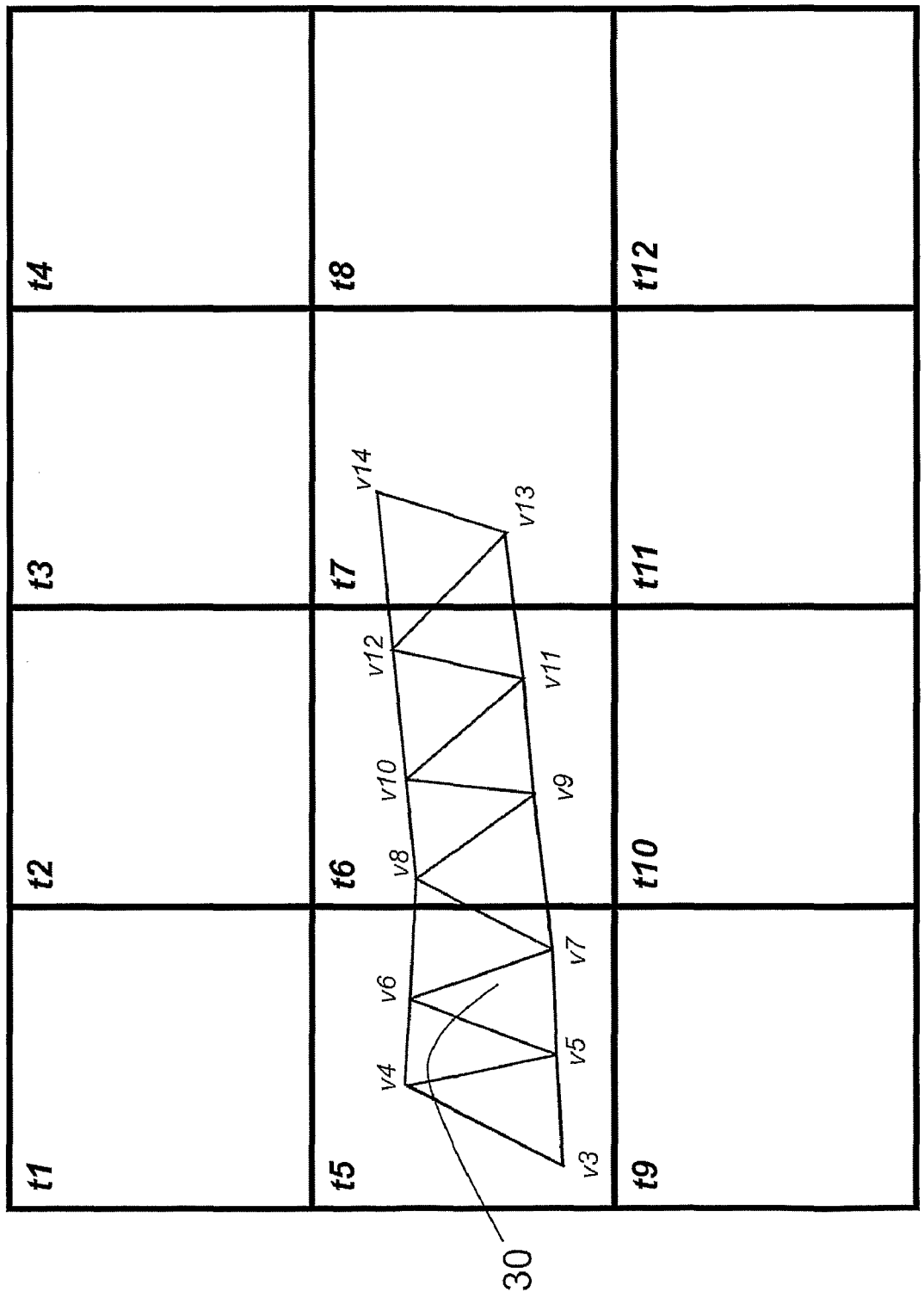
FIG. 3 shows a polygon strip, displayed on a screen.

FIG. 3 shows a polygon strip 30, displayed on a screen. The screen is divided into 12 tiles t1-t12. Tile size may be chosen depending on, for example, the size of on-chip memory, processing power, screen size and scene complexity. A mobile phone screen, with a 320×240 resolution may, for example, be divided into 10×15 tiles of 32×16 pixels. In FIG. 3 one triangle strip 30 is displayed on the screen. The triangle strip 30 overlaps three tiles, t5, t6 and t7. In the graphics system according to the invention, the tile processor 102 is operative to define sub-strips, each sub-strip comprising those polygons of a polygon strip which at least partly overlap a single one of the tiles. In FIG. 3, three sub-strips can be defined. A sub-strip covering tile t5 starting at vertex v3 and ending at vertex v9, a sub-strip covering tile t6, extending from vertex v6 to v14 and a sub-strip overlapping tile t7, extending from v11 to v14. For the processing of tile t5, the vertices v3 tot v9 are retrieved from the TTDB 103. The vertices v6 to v9 may be stored in the vertex cache 204 for re-use during the processing of tile t6.

Figure 4:
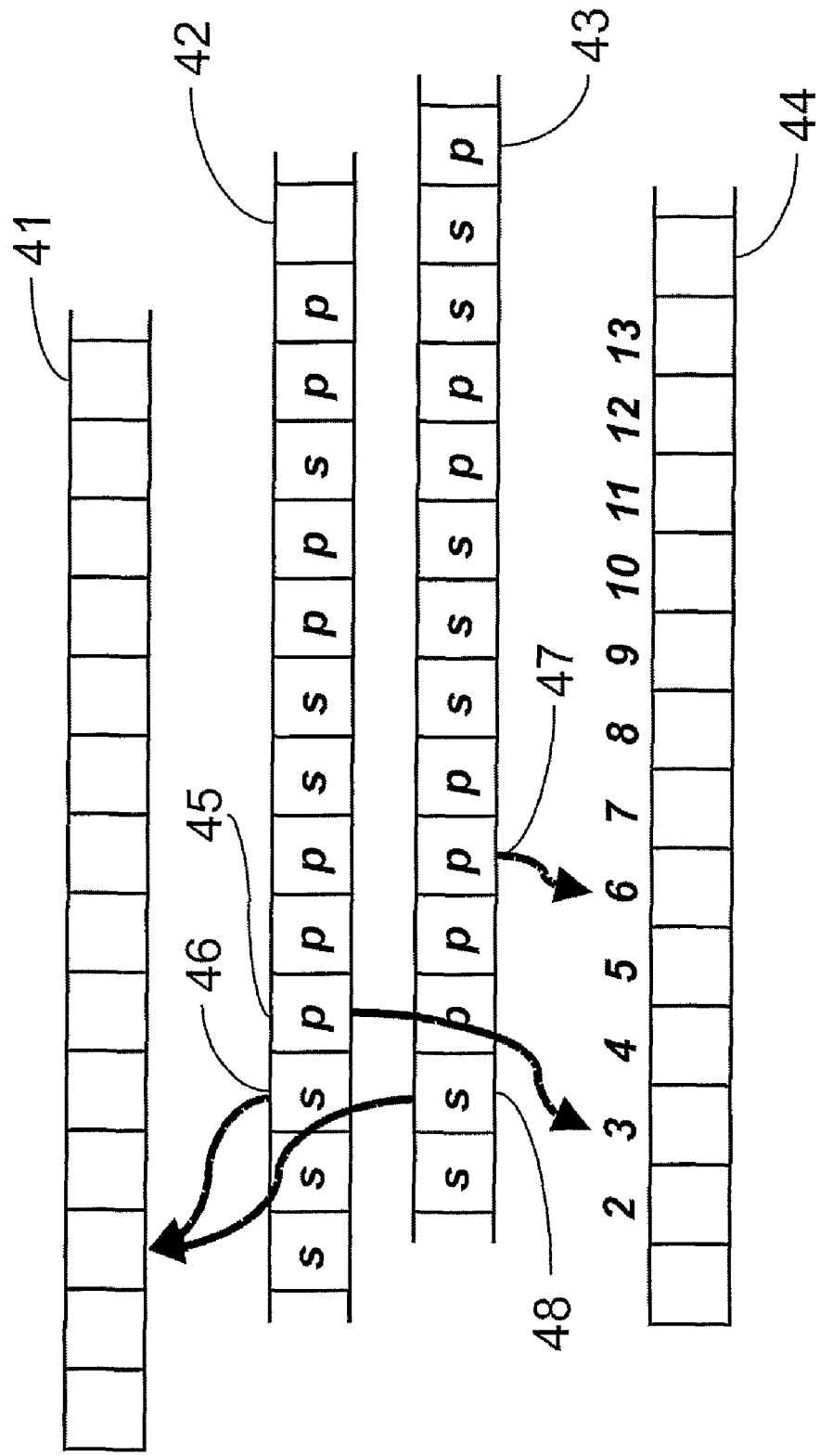
FIG. 4 schematically shows a possible TTDB data structure.

FIG. 4 schematically shows a possible TTDB data structure. The TTDB comprises a scene buffer with the vertex data. The scene buffer comprises a vertex array 44 and a texture pointers array 41. The vertex array 44 comprises geometry data concerning the vertices. A vertex may be coded using XYZUVRGBA-attributes: (x, y, z)-coordinate for the position of a vertex in screen space or another 3D space, (u, v)-coordinate for the position of a vertex in texture space and an RGBA color value for defining color and transparency of the vertex. The texture pointers array 41 comprises pointers to texture maps, stored in the texture memory 106.

The TTDB further comprises a display list for each tile. In FIG. 4 a display list 42 for tile t5 (see FIG. 3) and a display list 43 for tile t6 (see FIG. 3) are shown. The display lists comprise at least two types of entries possibly containing an index or pointer to a vertex such as 45 and 47, referring to vertex data in the vertex array 44 and state change entries such as 46 and 48. The state change data, contained by the s-entries, may be an index into the texture pointer array or may be a code indicating that a certain state should change. Other state changes such as fog, lighting and other enable/disable OpenGL features are directly encoded into the s-entry.

Each vertex pointer points to the first vertex of a sub-strip. For example, the display list 42 for tile t5 comprises a vertex pointer 45 to the first vertex v3 of the sub-strip shown in FIG. 3 and a state change entry 46 contains an index to a texture pointer 49 in the texture pointer array 41. All vertices of the sub-strip are processed, using the same state of the pipeline. When the last vertex of the sub-strip has been processed, processing of the next sub-strip, pointed at by the next vertex pointer is initiated. All triangles in the strip are being processed using the same texture, until a new texture state change entry is reached.

The end of a sub-strip may be determined by checking for each vertex whether it is part of a triangle overlapping the tile. In an embodiment of the graphics system, the display list further comprises a length of each one of the sub-strips or a pointer to the last vertex of the sub-strips. In such an embodiment, when rendering the tile, it is not required to check for each vertex whether it is part of the sub-strip being processed.

Figure 5:
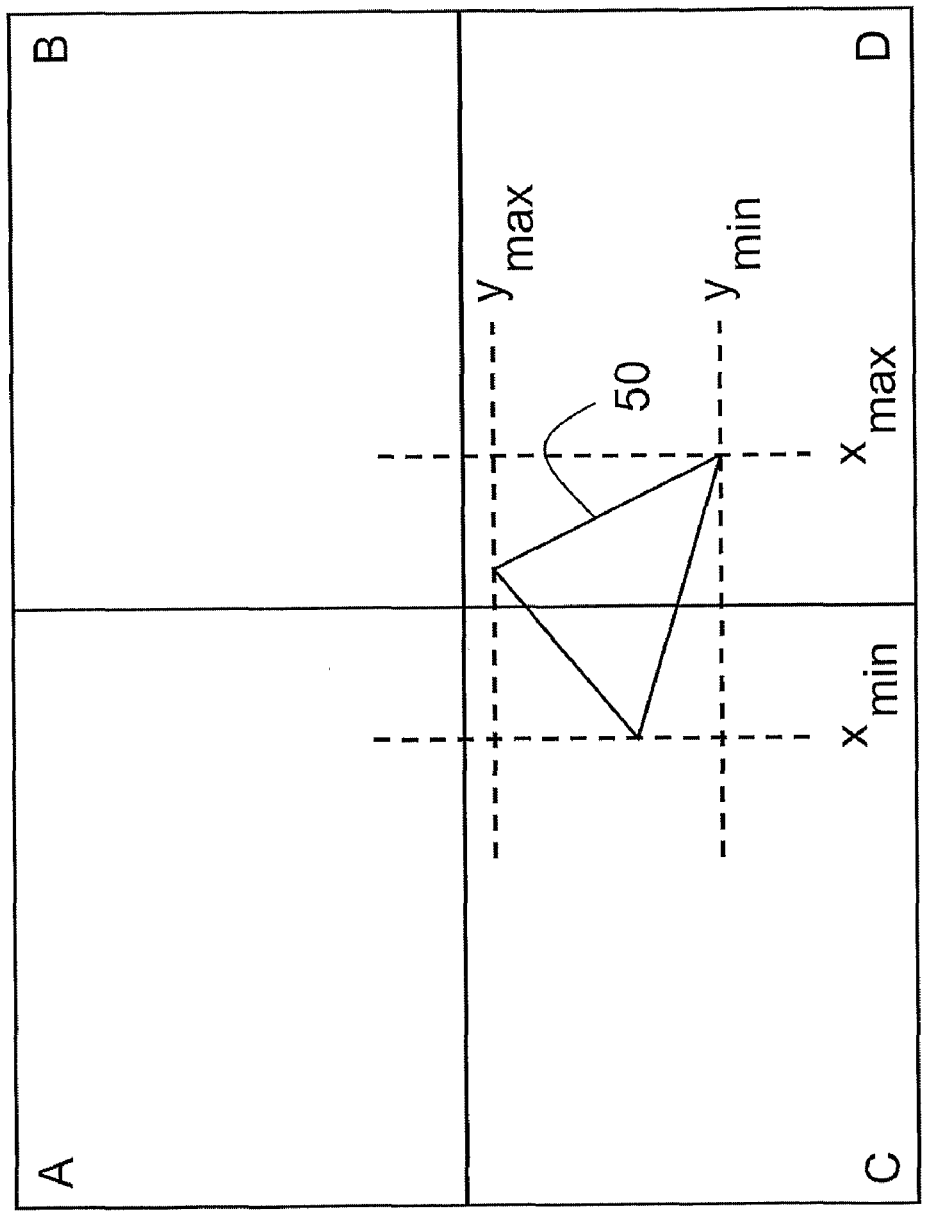
FIG. 5 shows a polygon overlapping two tiles.

FIG. 5 shows a polygon 50 overlapping the tiles C and D. An exemplary algorithm for determining which tiles are covered by a triangle 50 may comprise the following steps:

Create a bounding box around the triangle by determining the smallest x-coordinate value ($x_{min}$), the largest x-coordinate value ($x_{max}$), the smallest y-coordinate value ($y_{min}$) and the largest y-coordinate value ($y_{max}$) of the vertices constituting the triangle.

Start with the complete set of all tiles.

Exclude all tiles with a largest x-value, which is smaller than $x_{min}$.

Exclude all tiles with a smallest x-value, which is larger than $x_{max}$.

Exclude all tiles with a largest y-value, which is smaller than $y_{min}$.

Exclude all tiles with a smallest y-value, which is larger than $y_{max}$.

All tiles in the remaining set of tiles are covered by the triangle. In the graphics system shown in FIG. 1, this algorithm is executed by the Tile Processor 102. It is appreciated that other algorithms may be used, for determining which triangle covers which tiles. If the polygon is not a triangle but a quadrilateral, pentagon or other type of polygon, the same algorithm may be used.

It is to be noted that with the algorithm described above, basically, an overlap of a tile and the bounding box of the polygon is detected. When a polygon covers three tiles, for example the tile t2, t3 and t7 in FIG. 3, it is possible that the bounding box covers a fourth tile, in this event t6, while the polygon itself does not actually cover the fourth tile. In such a case the polygon is defined as overlapping the tile, although it is actually the bounding box and not the polygon that overlaps the tile. As a consequence a sub-strip may sometimes comprise a polygon, which does not actually cover the corresponding tile. However, the vertices of the unrequired polygon are probably still stored or may be stored in the vertex cache 204, for use with neighboring tiles. The additional polygon will not significantly increase the systems technical requirements, like memory size, calculation power and bandwidth. With a somewhat more complex algorithm it would be possible to know exactly which tiles are being covered by which polygons.

Figure 6:
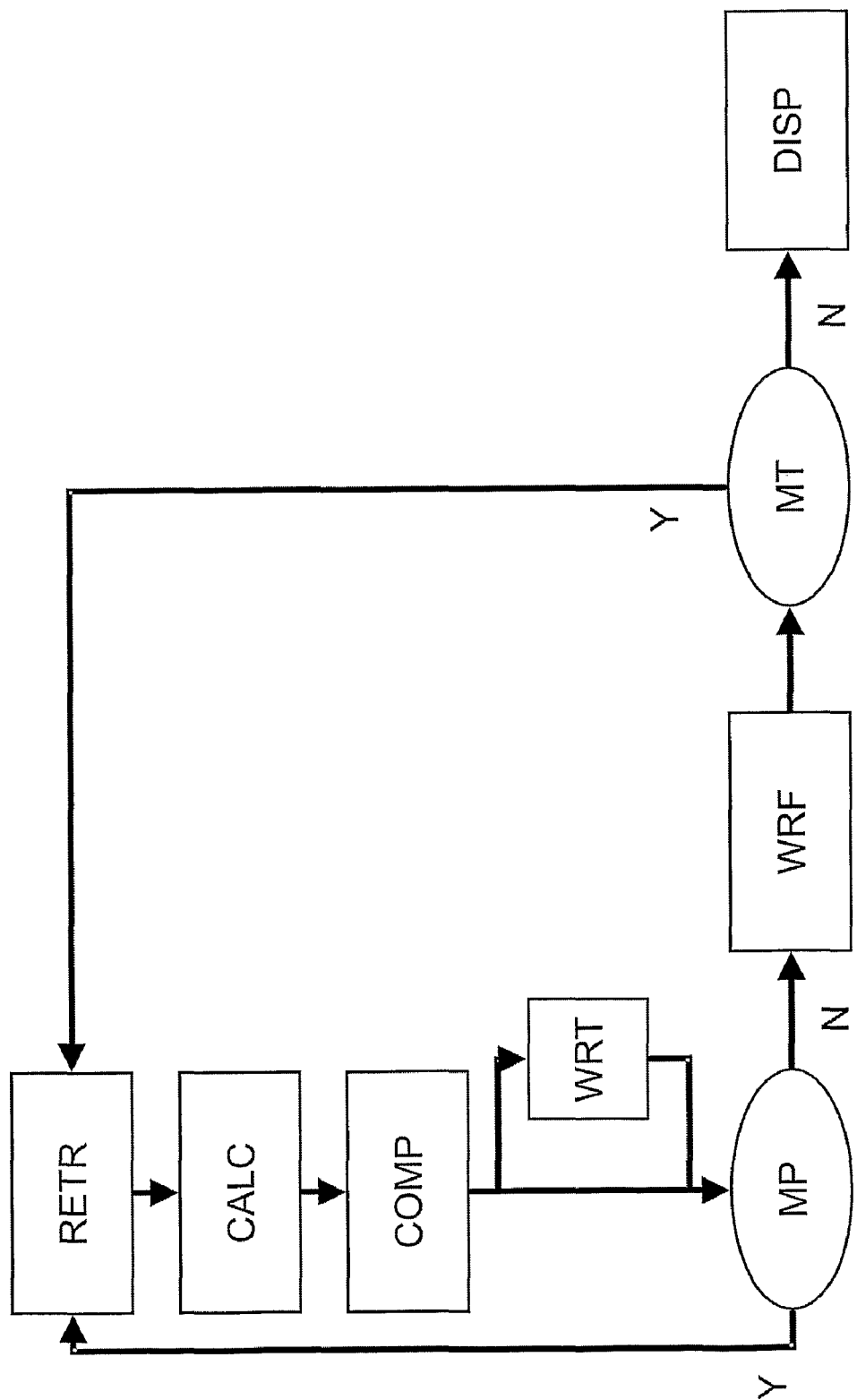
FIG. 6 shows a flow diagram of the process of calculating RGBA pixel values.

FIG. 6 shows a flow diagram of the process of calculating RGBA pixel values in the rasterizer 105. In a first RETR step the vertex data of a triangle of the first sub-strip in the display list of a tile is retrieved from the TTDB 103. Then in a CALC step the rasterizer traverses all pixels within the triangle and calculates the color, Z-value, the (u,v) texture coordinate and fetches the texel color for this coordinate from the current texture map, and possibly other attributes for each pixel.

In an optionally depth testing step COMP the calculated z-values are compared with the ones that are stored in the z-tile buffer 107. Depending on the result of the test, the stored z-value is replaced with the calculated z-value and the RGBA color is written into the RGBA-tile buffer 108 in a write step WRT. In a next step MP it is checked whether more triangles of the same sub-strip or more sub-strips on the same tile have to be processed. If so, the next triangle of the next sub-strip is processed starting with the first RETR step. If not, the complete RGBA-tile buffer 108 is copied to the frame buffer 110. After that, in a next step MT, it is checked whether more tiles on the frame have to be processed. If so, the first triangle of the first sub-strip of the next tile is processed starting again with the first RETR step. If not, the complete frame can be displayed on the screen 111 or sent to a beamer in a display step DISP.

Figure 7A:
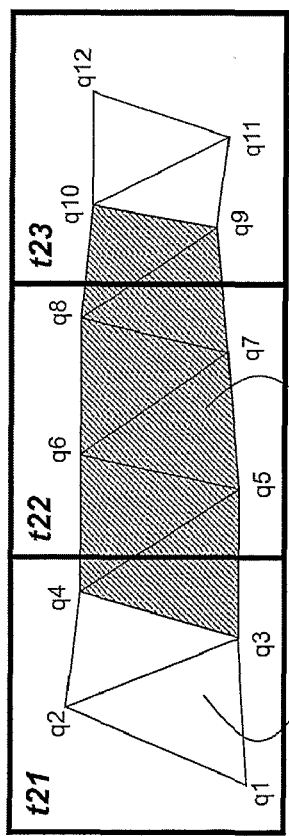
FIGS. 7A-7C illustrate the operation of several embodiments of a vertex cache.
Figure 7B:
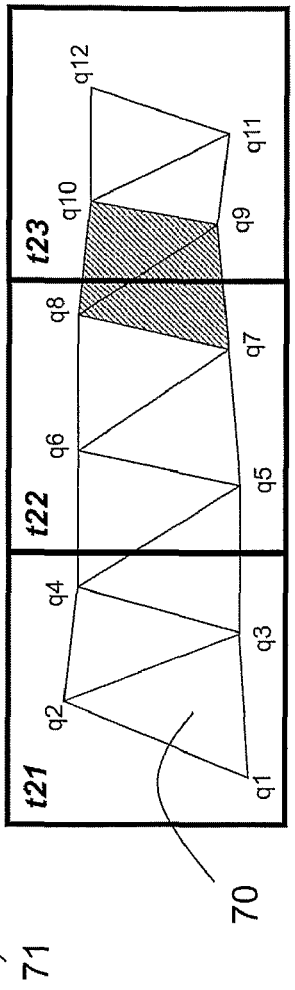
Figure 7C:
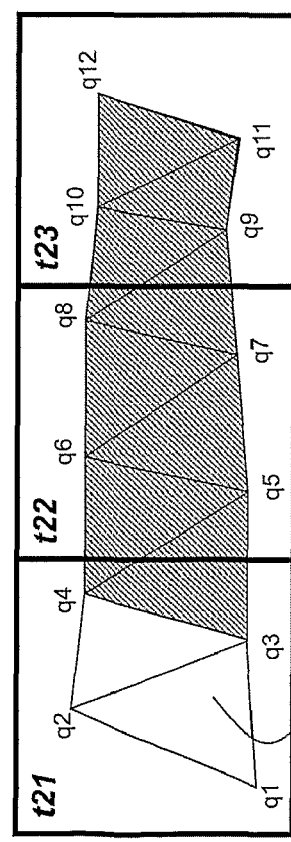

In FIGS. 7A-7C some examples of efficient cache management are elucidated. In FIG. 7A a polygon strip 70 is shown, being constituted of the vertices q1-q12. The polygon strip 70 overlaps the tiles t21, t22 and t23. In FIG. 7A a sub-strip 71 is highlighted. Before rendering tile t22, the vertices q3-q10 of the sub-strip 71 are loaded into the vertex cache 204, if they were not already there, so as to enable efficient rendering of the tile, by minimizing the bandwidth requirements to off-chip memory. Preferably, the vertex cache 204 comprises all vertices that will still be needed for rendering the image. This goal could easily be obtained by providing a vertex cache 204, large enough for comprising all vertex data of an image. However, such a large vertex cache 204 would be too expensive in terms of production costs and chip area.

In a preferred embodiment of the vertex cache 204, after rendering a tile, the vertices which are not to be used again for rendering other tiles are overwritten by vertices, which will be needed for rendering the other tiles. For example the vertices q7-q10, constituting the highlighted polygons of FIG. 7B, are needed for rendering the tile t23. As a consequence the vertices q7-q10 have to be maintained in the vertex cache 204, after rendering the tile t22. The other vertices q3-q6 of sub-strip 71 may be overwritten by other vertices, which are needed for rendering the tile t23.

In a further improved embodiment, before rendering a tile, vertices that are to be used later for rendering other tiles are loaded into the vertex cache 204. For example, before rendering the tile t22, additionally to caching the vertices q3-q10 of the sub-strip 71, the vertices q11 and q12, which are needed for rendering the tile t23, are loaded into the cache. In FIG. 7C, the shaded area, comprises the vertices which are cached before rendering the tile t22, when using this improved embodiment. With this embodiment the chance of data, needed for rendering a tile, not being retrievable directly from the vertex cache 204, is minimized. As a consequence less cache conflicts will occur.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier can be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device/system claims enumerating several means, several of these means may be embodied by one and the same item of hardware. The mere fact that certain measures are recited in mutually different dependent claims does not indicate that a combination of these measures cannot be used to advantage.

The invention claimed is:

1. A graphics system configured to convert vertex data tile-by-tile into output images for displaying on a screen, the vertex data representing objects by a set of polygons, a polygon being constituted of at least three vertices, the graphics system comprising:
an input configured to receive the vertex data, the vertex data at least comprising 3D space coordinates for each vertex in the image;
a tile processor configured to:
subdivide the image into a plurality of tiles,
determine polygon strips, each polygon strip comprising a sequence of at least one polygon, each succeeding polygon of a polygon strip sharing a side with its preceding polygon, and
determine sub-strips for each polygon strip, each sub-strip comprising those polygons of the polygon strip which at least partly overlap a single one of the tiles, and associate that tile with the overlapping sub-strips;
a polygon-tile database comprising a display list for each tile, the display list comprising a plurality of vertices and one or more state change entries, the one or more state change entries interspersed with the plurality of vertices, the one or more state change entries defining the appearance processing of the vertices, the one or more state change entries and the plurality of vertices configured such that all vertices in the display list subsequent to a particular one of the one or more state entries are appearance processed in the same manner until another one of the one or more state change entries in the display list is encountered to modify the appearance processing for further subsequent vertices; and
an output for enabling rendering of the images for display on the screen.

2. The graphics system as claimed in claim 1, wherein the display list comprises a reference to a first vertex of the sub-strip.

3. The graphics system as claimed in claim 2, wherein the display list comprises a reference to a last vertex of the sub-strip.

4. The graphics system as claimed in claim 2, wherein the display list comprises a number of vertices in the sub-strip.

5. The graphics system as claimed in claim 1, further comprising a vertex cache configured to cache vertex data of the sub-strips associated with a tile.

6. The graphics system as claimed in claim 5, wherein the vertex cache is configured to maintain vertex data that is to be used for a subsequent tile.

7. The graphics system as claimed in claim 5, wherein the vertex cache is configured to pre-fetch vertex data that is to be used for a subsequent tile.

8. A method for tile by tile converting of vertex data into output images for displaying on a screen, the vertex data representing objects by a set of polygons, a polygon being constituted of at least three vertices, the method comprising:
receiving the vertex data, the vertex data at least comprising 3D space coordinates for each vertex in the image;
subdividing the image into a plurality of tiles;
determining polygon strips, each polygon strip comprising a sequence of at least one polygon, each succeeding polygon of a polygon strip sharing a side with its preceding polygon;
for each polygon strip, determining sub-strips, each sub-strip comprising those polygons of the polygon strip which at least partly overlap a single one of the tiles, and associating that tile with the overlapping sub-strips;
filling a polygon-tile database comprising a display list for each tile, each display list comprising a plurality of vertices and one or more state change entries, the one or more state change entries interspersed with the plurality of vertices, the one or more state change entries defining the appearance processing of the vertices, the one or more state change entries and the plurality of vertices configured such that all vertices in the display list subsequent to a particular one of the one or more state entries are appearance processed in the same manner until another one of the one or more state change entries in the display list is encountered to modify the appearance processing for further subsequent vertices; and
enabling rendering of the images for display on the screen.

9. A computer program product stored in a non-transitory media configured to cause a processor to perform the method as claimed in claim 8.

10. The method as claimed in claim 8, wherein the display list comprises a reference to a first vertex of the sub-strip.

11. The method as claimed in claim 10, wherein the display list comprises a reference to a last vertex of the sub-strip.

12. The method as claimed in claim 10, wherein the display list comprises a number of vertices in the sub-strip.

13. The method as claimed in claim 8, further comprising caching in a vertex cache vertex data of the sub-strips associated with a tile.

14. The method as claimed in claim 13, further comprising maintaining in the vertex cache vertex data that is to be used for a subsequent tile.

15. The method as claimed in claim 13, further comprising pre-fetching vertex data that is to be used for a subsequent tile.

16. The method as claimed in claim 8, wherein the sub-strips are determined using a single test per polygon, the single test determining which tiles are at least partly overlapped by the polygon.

17. The method as claimed in claim 16, wherein the single test comprises calculating a bounding box for a polygon and comparing one or more tiles to the bounding box.

18. The graphics system as claimed in claim 1, wherein the tile processor is further configured to determine the sub-strips using a single test per polygon, the single test determining which tiles are at least partly overlapped by the polygon.

19. The graphics system as claimed in claim 18, wherein the single test comprises calculating a bounding box for a polygon and comparing one or more tiles to the bounding box.

20. The graphics system as claimed in claim 18, wherein at least one polygon is a triangle.

* * * * *